(12) United States Patent
Patel

(10) Patent No.: US 11,215,263 B2
(45) Date of Patent: Jan. 4, 2022

(54) BIDIRECTIONAL WEDGE CLAMP

(71) Applicant: Niraj Patel, Rockville, MD (US)

(72) Inventor: Niraj Patel, Rockville, MD (US)

( * ) Notice: Subject to any disclaimer, the term of this patent is extended or adjusted under 35 U.S.C. 154(b) by 176 days.

(21) Appl. No.: 16/512,269

(22) Filed: Jul. 15, 2019

(65) Prior Publication Data

US 2021/0018064 A1 Jan. 21, 2021

(51) Int. Cl.
*F16G 11/04* (2006.01)
*B63B 21/08* (2006.01)
*F16G 11/02* (2006.01)

(52) U.S. Cl.
CPC .............. *F16G 11/04* (2013.01); *B63B 21/08* (2013.01); *F16G 11/02* (2013.01)

(58) Field of Classification Search
CPC ...... F16G 11/04; F16G 11/044; F16G 11/048; F16G 11/105; F16G 11/106; B63B 21/08; E04C 5/122; Y10T 24/3969; Y10T 24/3973; Y10T 24/3996
See application file for complete search history.

(56) References Cited

U.S. PATENT DOCUMENTS

| 4,643,609 A * | 2/1987 | Biass ................. | F16B 2/14 24/122.3 |
| 6,997,287 B2 * | 2/2006 | Sasaki .................. | B66B 5/22 187/376 |
| 10,458,516 B2 * | 10/2019 | Jenkin ................... | F16G 11/048 |
| 2018/0058542 A1 * | 3/2018 | Jenkin ...................... | H02G 1/10 |
| 2020/0223665 A1 * | 7/2020 | Shiraishi ................... | B66B 5/22 |

FOREIGN PATENT DOCUMENTS

| DE | 29614516 U1 * | 1/1998 | ............... B66B 5/22 |
| FR | 2678036 A1 * | 12/1992 | ............... E04C 5/12 |
| GB | 520375 A * | 4/1940 | ............ F16G 11/048 |

OTHER PUBLICATIONS

Machine translation of DE 29614516 (Year: 1998).*
Machine translation of FR 2678036 (Year: 1992).*

* cited by examiner

*Primary Examiner* — Michael McCullough

(57) ABSTRACT

A bidirectional, wedge clamp is disclosed. Conventional clamps, such as those used with electrical cables mainly secure a line in a single direction. The invention herein being comprised of a bidirectional clamp for conventional cables, wires and rope etc. (herein referred to as a 'line') having a simple and easily-operable construction, wherein two plate-like members and an outer sleeve-like member are telescopically assembled to clamp a line there between. Plates and sleeve members having a plurality of interconnected, opposing number of wedges that when acted upon in a lateral motion by a line there between, causing said wedges to slide against one another—thereby tightening down the plates onto said line and preventing slippage. An object of the invention is to clamp a line and prevent slipping laterally in either direction along the line's longitudinal axis.

6 Claims, 13 Drawing Sheets

BIDIRECTIONAL WEDGE CLAMP

CROSS-REFERENCE TO RELATED APPLICATIONS

This application claims the benefit of U.S. Provisional Patent Application Confirmation No. 62/712,922, filed on Jul. 31, 2018.

FIELD OF THE INVENTION

The present invention generally relates to clamps. More specifically, it relates to a self-tightening wedge clamp that secures onto a line and prevents slippage in either direction.

BACKGROUND

Anchoring cables or ropes at one or both ends can be difficult because such lines does not bear threads to receive bolts. A number of cable anchoring methods have been used to secure cables in bridges and towers over the centuries. One example is a multi-strand anchorage device which separates strands of a cable and anchors each strand individually or in groups. Another example comprises fixing a thread-bearing sleeve over the cable at the desired locations to receive a desired bolt. Another example includes unraveling the cable and sliding a ring over and down along the center wire of the cable to a desired location and then rewinding the cable. In this way, a bulge or 'bird cage' is formed in the cable due to a spreading of the wires in the area of the ring. Another form of cable anchors is called a 'button anchor' and theses are affixed in such a manner as to prevent a cable from slipping in either direction due to a compression ring or set screw. U.S. Pat. Nos. US1218138A, US20080247839, US854957A, and US854957A disclosed button-stop for cables having wedges however they require special tools to install.

The cable industry has a been developing cable clamps with wedges to make installation and operation easier. Chinese patent number CN203098737U disclosed a bidirectional wedge-shaped connector for rope, however it has two connection points joined with an axle pin. Chinese patent number CN103206428B disclosed a Bidirectional wedge-shaped locking device hydraulic locking device for cables, however it relies on hydraulics. Chinese patent number CN202321860U disclosed a bidirectional wedge system for elevator cables, however it operates within and external housing system. Chinese patent number CN204025529U disclosed a bidirectional wedge block assembly for steel wire ropes, however it has two interlocking connection points for a single looped to cable rather than a single point of connection.

SUMMARY OF THE INVENTION

The device herein disclosed and described provides a solution to the shortcomings in the prior art through the disclosure of a wedge clamp that secures a line in either direction along its longitudinal axis. An object of the invention is to provide a line clamp of simple and easy operable construction being capable of restraining a line by a wedge action. For this purpose, this invention comprises two main parts: first part being a set of plates having wedge-like portions (herein referred to as 'wage plates') becoming narrower starting at the rear end thereof in towards the front end of the same. The wedges on said plates being disposed to fit with wedges configured inside a surrounding sleeve. In the line clamping state, the wedge- and sleeve-like members are assembled in such a fashion that the former may be held in the latter from below in the use of said upper edges of the latter. Thus, a line is to be clamped between the plates of said two members through a wedge action.

Another object of the invention is to provide a means to prevent a line from slipping within the invention in either direction or 'bidirectional.' The aforementioned wedges being formed on plates and sleeve in an opposing manner in both directions along its longitudinal axis such that should a plate slip in either direction along its longitudinal axis, the plates being wedged into the sleeve wedges causing said plates to clamp down further on the line—thereby halting slippage.

Another object of the invention is to provide a line clamp actuated by a wedge action as mentioned above, wherein the sleeve and the wedge plates are adapted to be in an inseparable (or linked) condition at any time by means of bolts mounted on the sleeve.

Another object of this invention is to allow a clamp to be installed using conventional tools. Two halves of the sleeve are secured to the wedge plates using bolts as mentioned above. Said bolts being easily affixed by means of, but not limited to wrenches, branches and sockets and the like.

It is briefly noted that upon a reading this disclosure, those skilled in the art will recognize various means for carrying out these intended features of the invention. As such it is to be understood that other methods, applications and systems adapted to the task may be configured to carry out these features and are therefore considered to be within the scope and intent of the present invention, and are anticipated. With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention. As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

The objects features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon.

BRIEF DESCRIPTION OF THE FIGURES

The accompanying drawings, which are incorporated herein and form a part of the specification, illustrate some, but not the only or exclusive, examples of embodiments and/or features.

Figure 1:
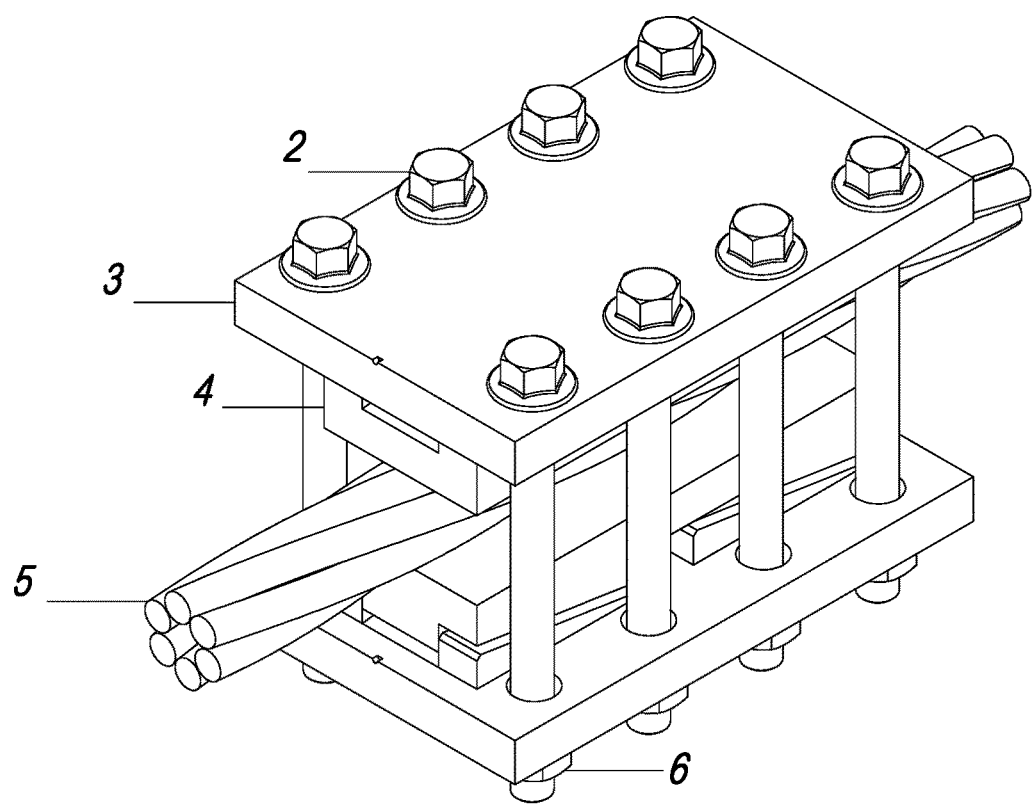
FIG. 1 shows a perspective view of the square embodiment.

Other aspects of the present invention shall be more readily understood when considered in conjunction with the accompanying drawings, and the following detailed description, neither of which should be considered limiting.

DETAILED DESCRIPTION OF FIGURES

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation. Conventional components of the invention are elements that are well-known in the prior art and will not be discussed in detail for this disclosure.

Figure 2:
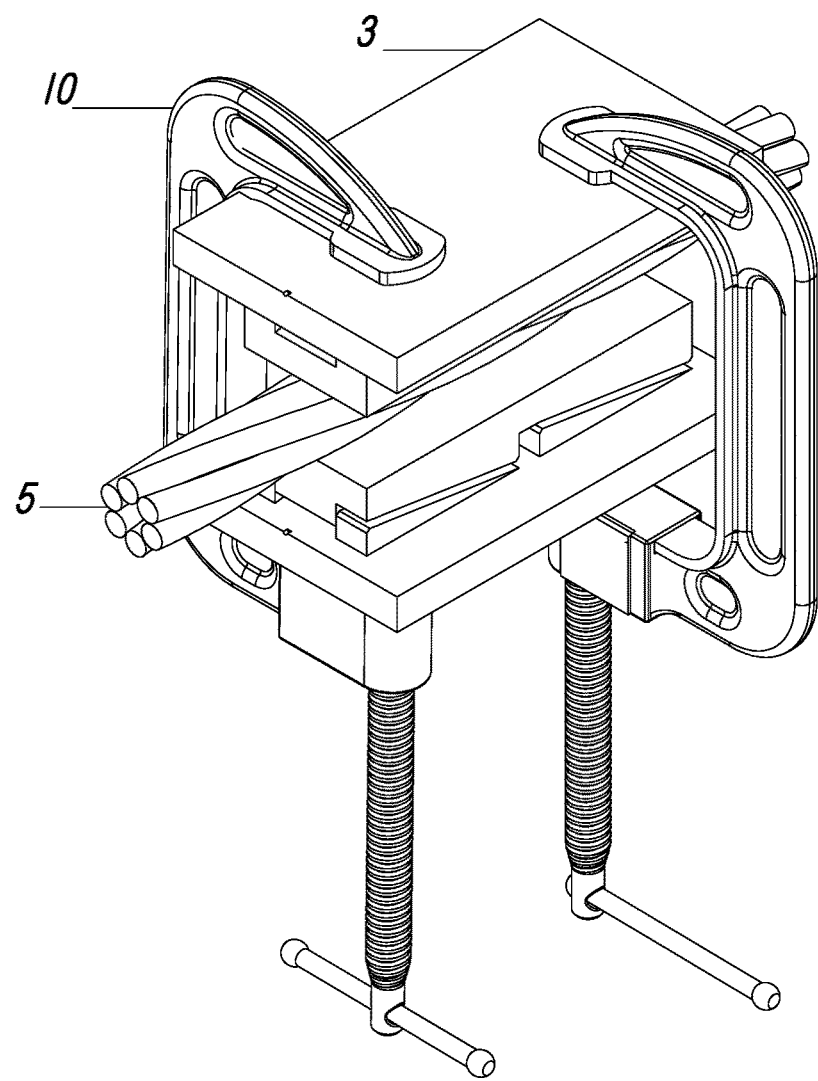
FIG. 2 shows a perspective view of the square embodiment with clamps.

FIG. 1 showing a perspective view of the square embodiment having three main parts. A first part being a set of at least, but not limited to, two sleeve members 3 having a rectangular, planar shape and comprised of a rigid material such as but not limited to metal, plastic and the like. Said sleeve members 3 sandwiching a plurality of wedge plates 4. Other embodiments can have other numbers of wedges. The wedge plates 4 also being comprised of a rigid material such as but not limited to metal, plastic and the like. FIG. 1 also showing the square embodiment with said sleeve members 3 having a plurality of apertures disposed on distal ends to receive a multitude of bolts therein allowing the wedge plates to be assembled around and make contact with a line 5 selectively positioned there between. FIG. 2 showing a perspective view of the square embodiment having no apertures and clamps 10 securing said sleeves 3—other means of securing said sleeves 3 being comprised of but not limited to: springs, levers, devises, strapping, rings and the like.

Figure 3:
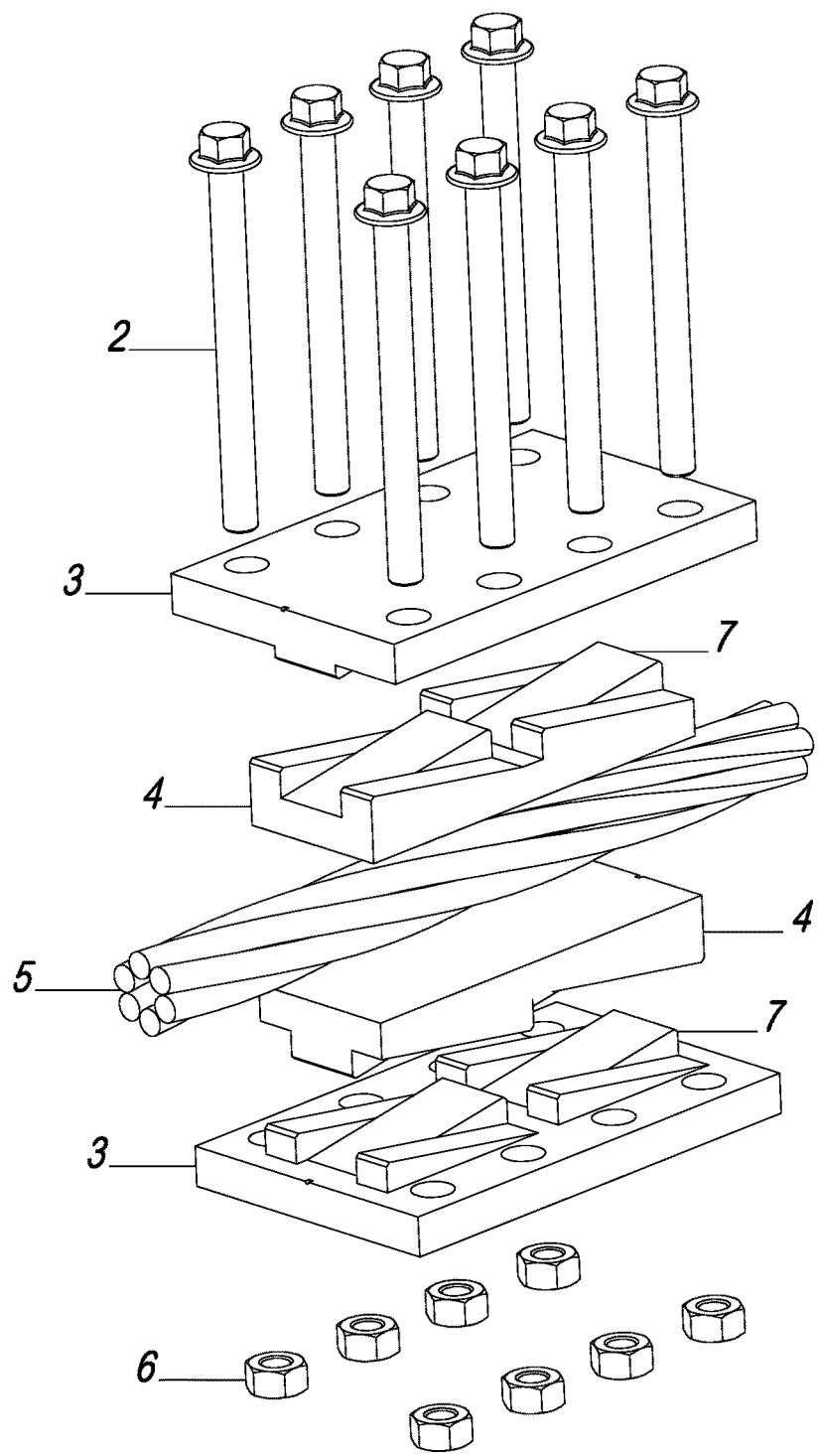
FIG. 3 illustrates an exploded view of the square embodiment.
Figure 4:
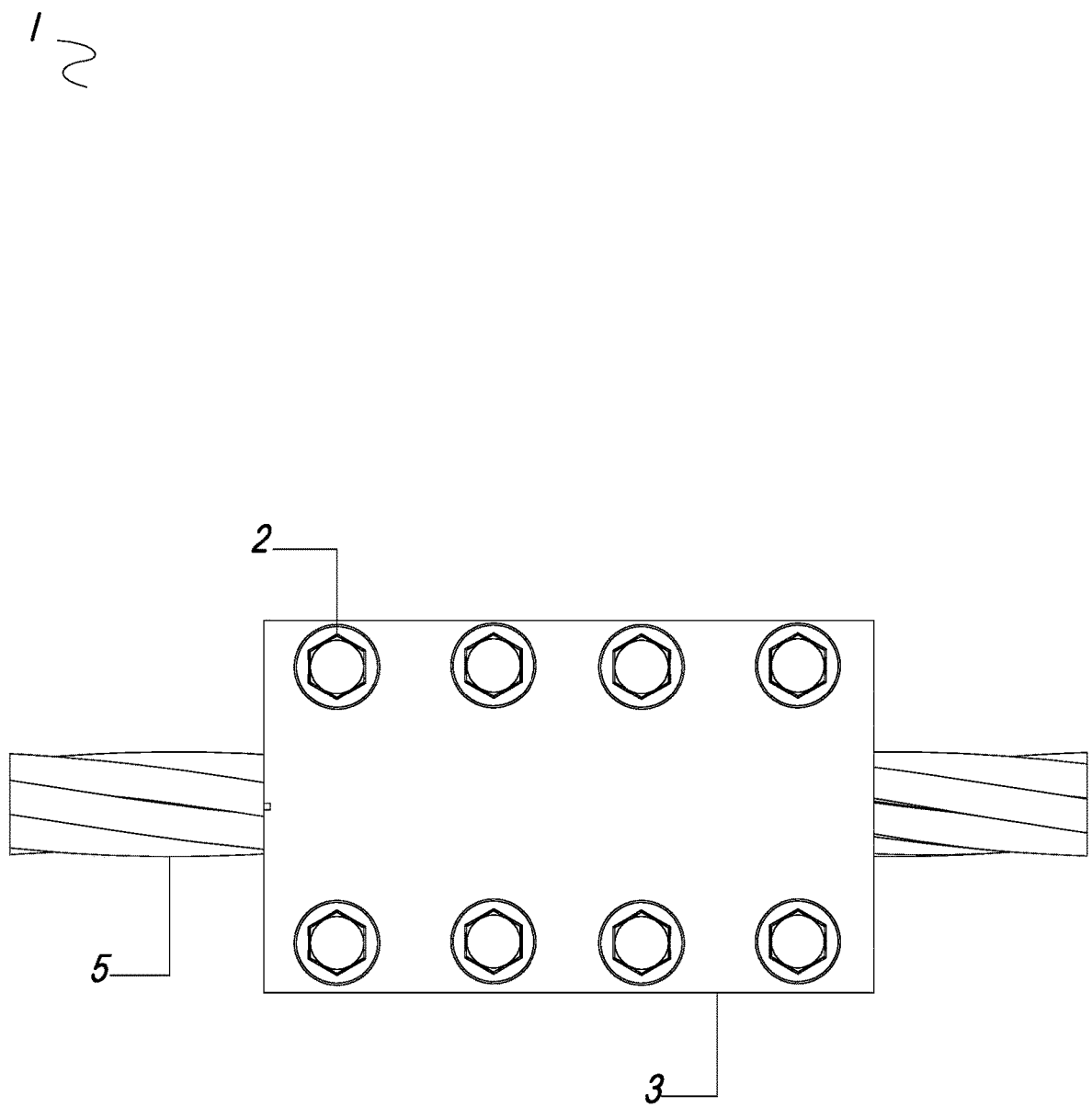
FIG. 4 shows a top view of the square embodiment.
Figure 5:
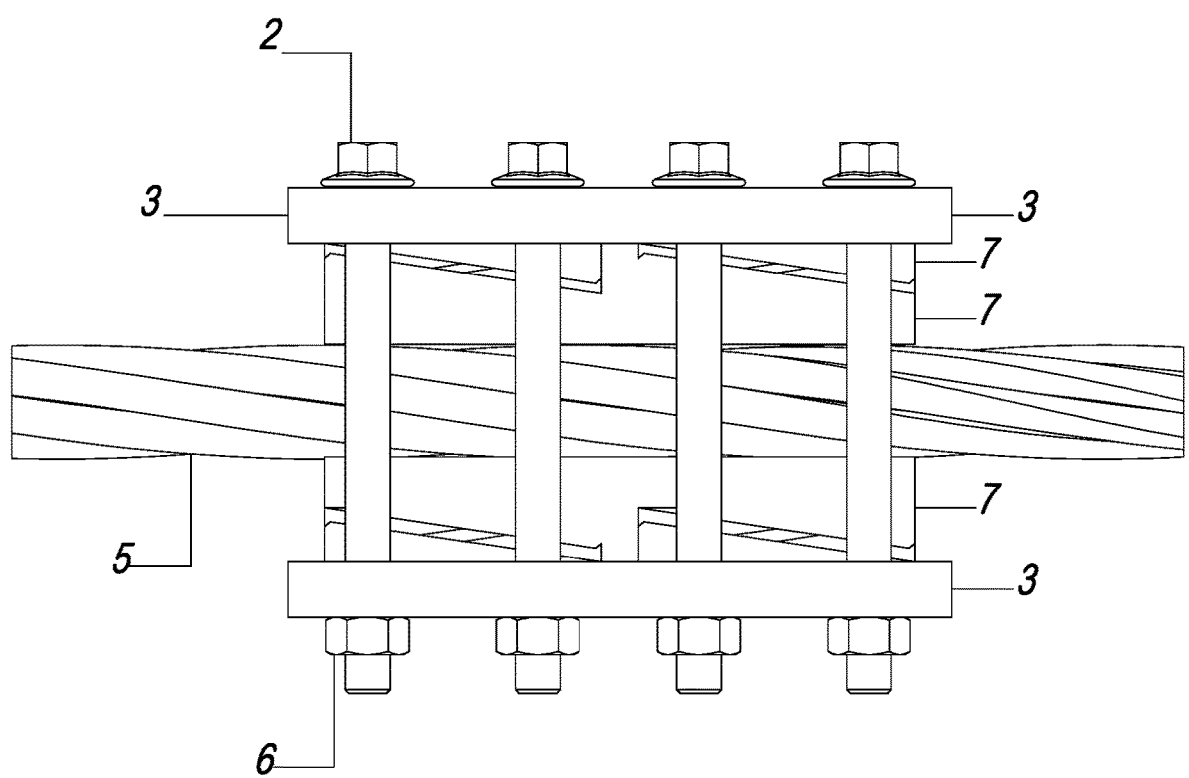
FIG. 5 shows a side view of the square embodiment.
Figure 6:
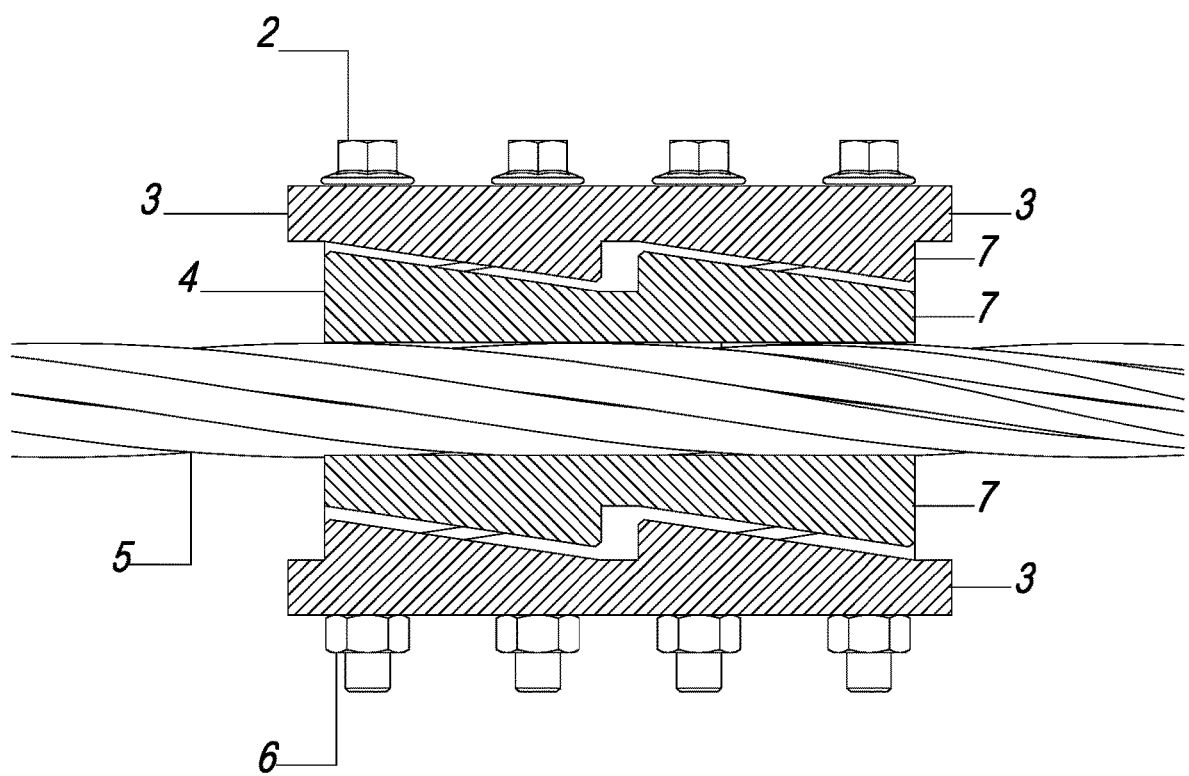
FIG. 6 illustrates a section view of the square embodiment.
Figure 7:
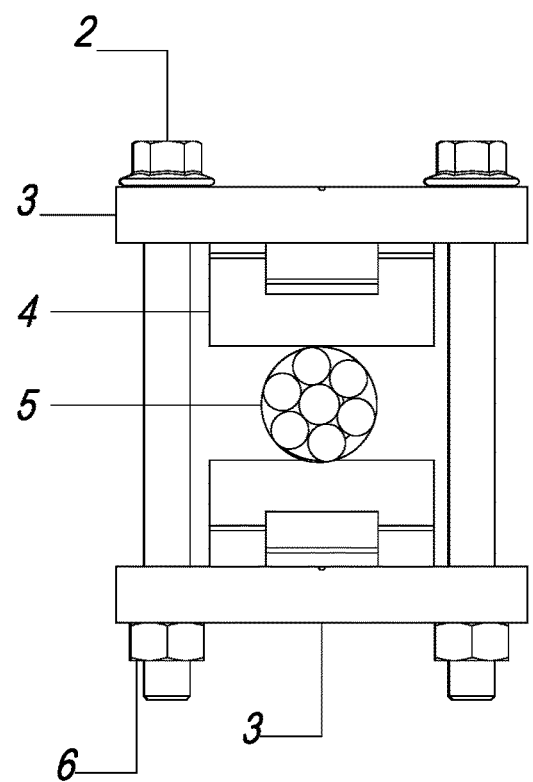
FIG. 7 shows a front view of the square embodiment.

FIG. 3 illustrates an exploded view of the square embodiment showing a plurality of wedge portions 7 in the aforementioned sleeves 3 and wedge plates 4 thereon. Said wedges 7 being configured along sleeve 3's and wedge plate 4's longitudinal axis. Equal numbers of wedges 7 having raised portions opposing one another. Wedge portions 7 on plate 4 mating with wedge portions on sleeve 3 so that wedge plate 7 moves a continuous, perpendicular distance away from said sleeve 3 thereby collecting down on line 5 there between. FIG. 4 showing a top view of the square embodiment with bolts 2; FIG. 5 showing a side view of the square embodiment and FIG. 6 illustrating a section view of the square embodiment. Both FIGS. 5 and 6 illustrating wedge portions 7 being engaged on both wedge plate 4 and sleeve 3. Finally, FIG. 7 showing a front view of the square embodiment bolts 2 and nuts 6.

Figure 8:
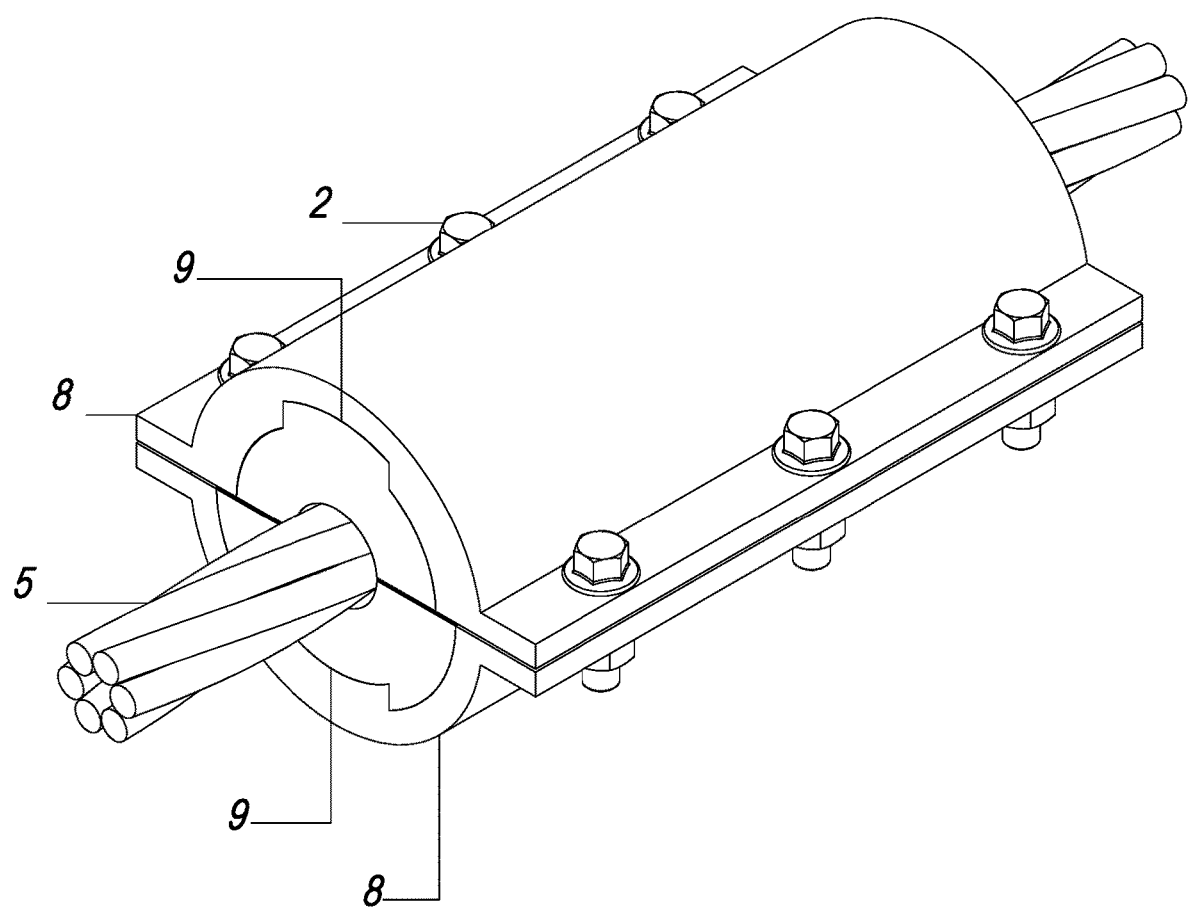
FIG. 8 shows a perspective view of the cylinder embodiment.

FIG. 8 showing a perspective view of the cylinder embodiment also having three main parts. A first part being a set of at least, but not limited to, two cylinder sleeve members 8 having an elongated, cylindrical shape with mating flanges on each distal end and comprised of a rigid material such as but not limited to metal, plastic and the like. Said cylinder sleeve members 8 sandwiching a set of at least, but not limited to, two cylinder wedges plate 9. The cylinder wedge plates 9 also being comprised of a rigid material such as but not limited to metal, plastic and the like. FIG. 8 also showing the cylinder embodiment with said cylinder sleeve members 8 having a plurality of apertures disposed on distal ends to receive a multitude of bolts 2 therein allowing the cylinder wedge plates 9 to be assembled around and make contact with a line 5 selectively positioned there between. Similar to the square embodiment, the cylinder embodiment having other means of securing said cylinder sleeve 8 flanges being comprised of but not limited to: springs, levers, clevises, strapping, rings and the like.

Figure 9:
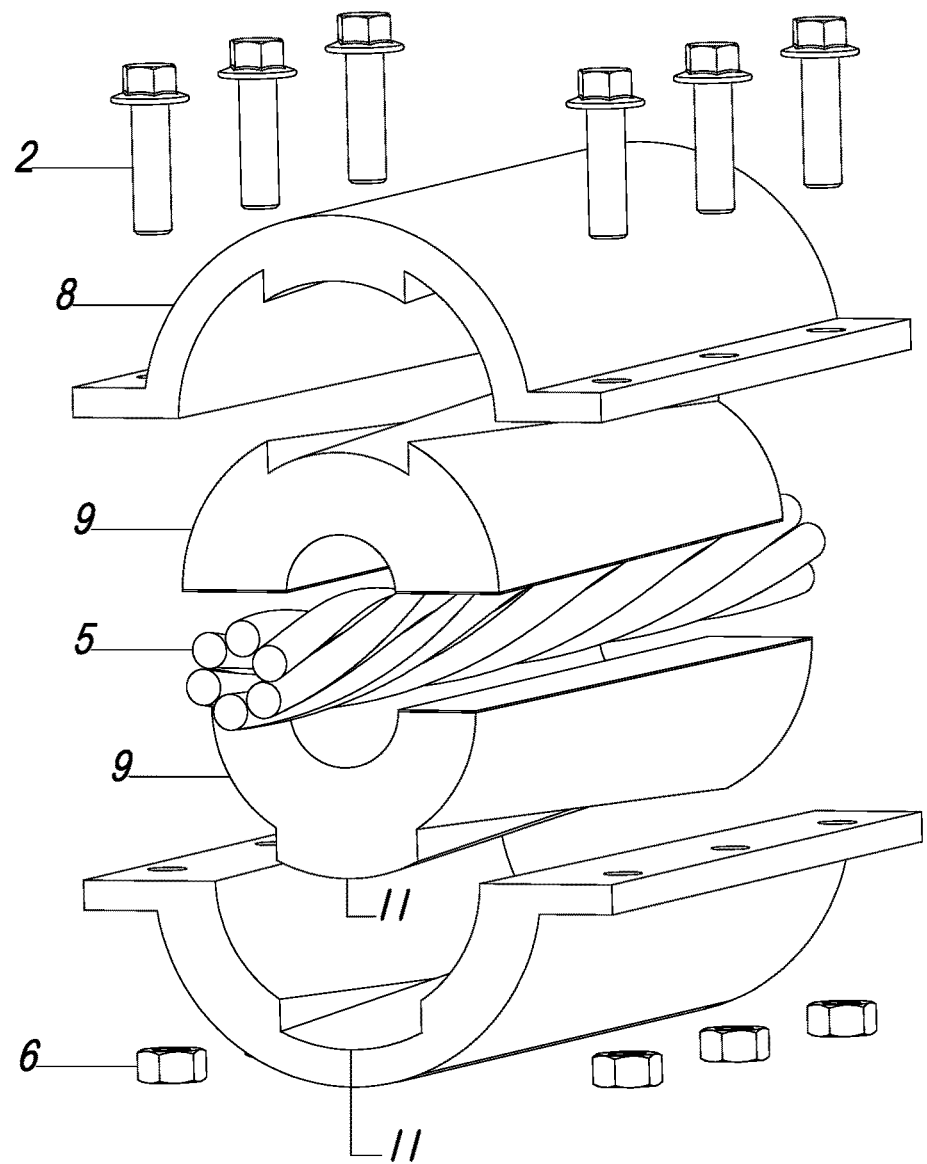
FIG. 9 shows an exploded view of the cylinder embodiment.
Figure 10:
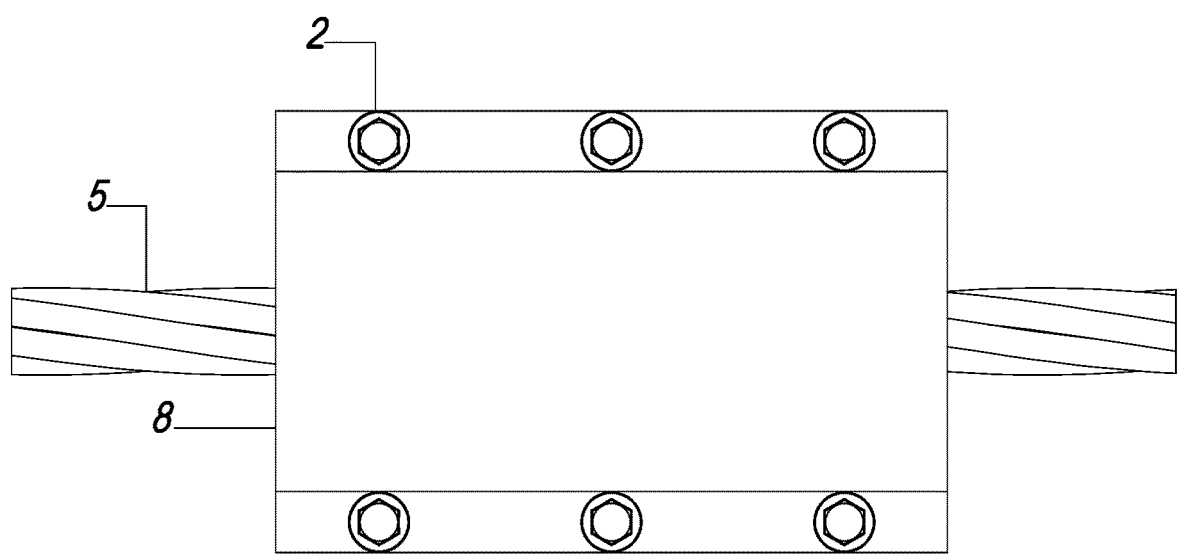
FIG. 10 illustrates a top view of the of the cylinder embodiment.
Figure 11:
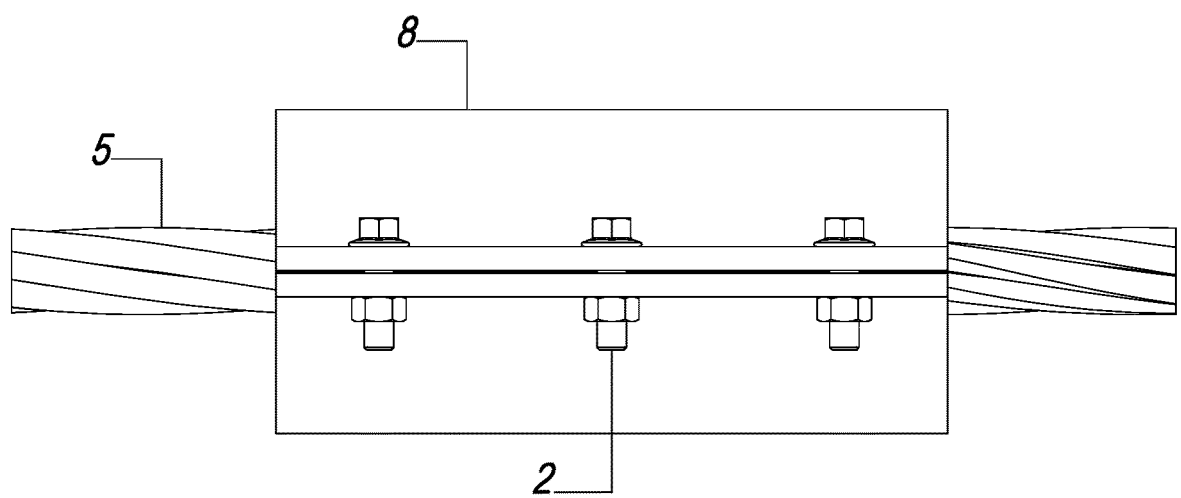
FIG. 11 shows a side view of the square embodiment.
Figure 12:
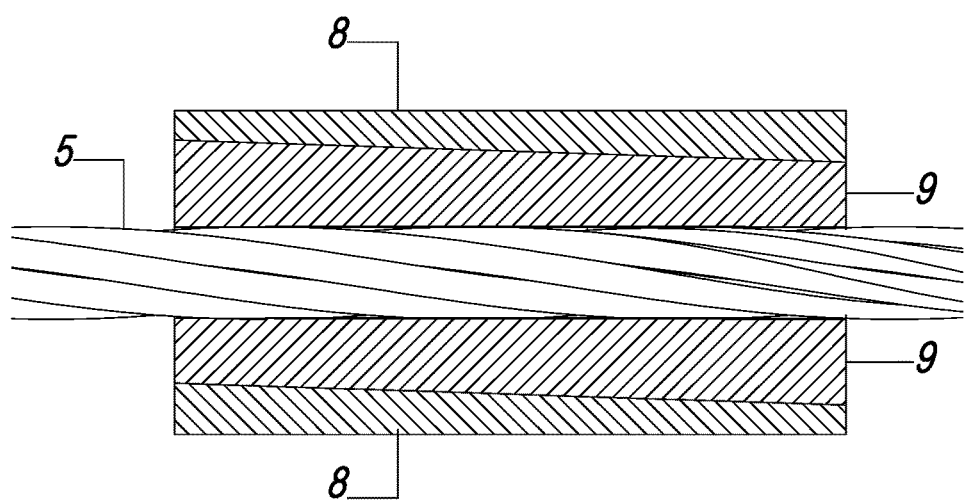
FIG. 12 shows a section view of the cylinder embodiment.
Figure 13:
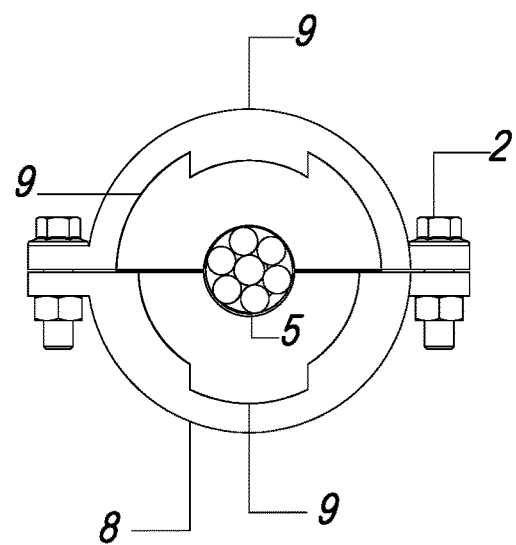
FIG. 13 illustrates a front view of the cylinder embodiment.

FIG. 9 illustrating an exploded view of the cylinder embodiment showing a plurality of wedge portions in the aforementioned cylinder sleeves 8 and cylinder wedges 9 thereon. Said wedges being configured along cylinder sleeve 8's and cylinder wedge plate 9's longitudinal axis. Both cylinder sleeves 8 and cylinder wedges 9 having raised portions opposing one another and mate with one another so that cylinder wedge 9 moves a continuous, perpendicular distance away from said cylinder sleeve 8 thereby collecting down on line 5 there between. FIG. 10 showing a top view of the square embodiment with bolts 2; FIG. 11 showing a side view of the cylinder embodiment and FIG. 12 illustrates a section view of the cylinder embodiment. FIG. 12 illustrating wedge portions being engaged on both cylinder wedge 9 and cylinder sleeve 3. Finally, FIG. 13 showing a front view of the cylinder embodiment with bolts 2 and nuts 6.

It is additionally noted and anticipated that although the device is shown in its most simple form, various components and aspects of the device may be differently shaped or slightly modified when forming the invention herein. As such those skilled in the art will appreciate the descriptions and depictions set forth in this disclosure or merely meant to portray examples of preferred modes within the overall scope and intent of the invention, and are not to be considered limiting in any manner. While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention.

What is claimed is:

1. A clamp comprising:
    a pair of sleeves, each sleeve positioned; and
    a pair of wedge plates, wherein the wedge plates are sandwiched between the sleeves in that each wedge plate connects one of the sleeve at one end, and receives a line at the other end, and wherein the line is sandwiched between the wedge plates,
    wherein each wedge plate comprises wedge plate portions, the wedge plate portions extending from the wedge plate and positioned in a slanted and adjacent manner, facing each other,
    wherein each sleeve comprises sleeve portions, the sleeve portions extending from the sleeve and positioned in a slanted and adjacent manner, facing each other, and
    wherein the wedge plate portions and the sleeve portions position in opposing manner and mate, to prevent the wedge plates from sliding and the line from slipping in either direction along its longitudinal axis.

2. The clamp of claim 1, wherein the sleeves comprise a plurality of apertures at distal ends.

3. The clamp of claim 2, wherein the plurality of apertures receive fasteners to secure the line between the wedge plates.

4. A method of clamping a line, the method comprising steps of:
    providing a pair of sleeves, each sleeve positioned opposite each other;
    providing a pair of wedge plates, the wedge plates being sandwiched between the sleeves in that each wedge plate connects one of the sleeves at one end, and receives a line at the other end, the line being sandwiched between the wedge plates;
    providing wedge plate portions at each wedge plate, the wedge plate portions extending from the wedge plate and positioned in a slanted and adjacent manner, facing each other;
    providing sleeve portions at each sleeve, the sleeve portions extending from the sleeve and positioned in a slanted and adjacent manner, facing each other;
    mating the wedge plate portions and the sleeve portions position in opposing manner; and
    restraining a line by a wedge action of the wedge plates and preventing the wedge plates from sliding and the line from slipping in either direction along its longitudinal axis.

5. The method of claim 4, further comprises providing a plurality of apertures at distal ends of the sleeves.

6. The method of claim 5, further comprises providing fasteners for insertion in the plurality of apertures to secure the line between the wedge plates.

* * * * *